(12) United States Patent
Alexandre et al.

(10) Patent No.: US 11,647,758 B2
(45) Date of Patent: May 16, 2023

(54) TOOL FOR CUTTING ALONG A PATH ALONG THE SPINOUS PROCESSES IN AN ANIMAL CARCASS, AND A SLAUGHTERHOUSE CUTTING DEVICE WITH THE TOOL

(71) Applicants: Frontmatec Kolding A/S, Kolding (DK); AIRA ROBOTICS S.L., Cardona (ES)

(72) Inventors: Lemieux Alexandre, St-Anselme (CA); Jane Lopez Francisco Javier, Cardona (ES)

(73) Assignees: FRONTMATEC KOLDING A/S, Kolding (DK); AIRA ROBOTICS S.L., Cardona (ES)

( * ) Notice: Subject to any disclaimer, the term of this patent is extended or adjusted under 35 U.S.C. 154(b) by 0 days.

(21) Appl. No.: 17/376,854

(22) Filed: Jul. 15, 2021

(65) Prior Publication Data

US 2022/0015379 A1 Jan. 20, 2022

(30) Foreign Application Priority Data

Jul. 17, 2020 (EP) .................................... 20382654

(51) Int. Cl.
*A22B 5/20* (2006.01)
*A22B 5/00* (2006.01)

(52) U.S. Cl.
CPC ............ *A22B 5/201* (2013.01); *A22B 5/0029* (2013.01); *A22B 5/0041* (2013.01); *A22B 5/207* (2013.01)

(58) Field of Classification Search
CPC ..... A22B 5/201; A22B 5/0029; A22B 5/0041; A22B 2/207; A22B 5/0017

USPC ........ 452/102–105, 152, 153, 155, 157, 160
See application file for complete search history.

(56) References Cited

U.S. PATENT DOCUMENTS

| | | | |
|---|---|---|---|
| 5,372,538 A * | 12/1994 | Ketels ................. | A22B 5/0052 452/160 |
| 6,200,211 B1 | 3/2001 | Braeger et al. | |
| 6,280,313 B1 | 8/2001 | Braeger et al. | |
| 8,454,141 B2 * | 6/2013 | Matsumoto ......... | B41J 2/17543 347/85 |
| 8,628,387 B2 * | 1/2014 | Wood .................... | B26B 13/22 452/137 |
| 8,986,081 B2 * | 3/2015 | Ueffing ............... | A22B 5/0041 452/156 |

(Continued)

FOREIGN PATENT DOCUMENTS

| | | |
|---|---|---|
| AU | 2019 229 374 A1 | 5/2020 |
| CA | 3073638 A1 | 3/2019 |

(Continued)

OTHER PUBLICATIONS

European Search Report (ten pages) dated Jan. 21, 2019 from Corresponding EP Application No. 20 38 2654.

*Primary Examiner* — Richard T Price, Jr.
(74) *Attorney, Agent, or Firm* — Crowell & Moring LLP; John C. Freeman

(57) ABSTRACT

A slaughterhouse processing tool including two opposite knives mounted to a knife holder via respective mounting structures, the knife holder further including an actuator, at least one of the mounting structures being movably mounted to the knife holder, the actuator being coupled to the movably mounted mounting structure for moving the mounting structure relative to the knife holder.

23 Claims, 9 Drawing Sheets

(56) References Cited

U.S. PATENT DOCUMENTS

| | | | |
|---|---|---|---|
| 11,134,692 B2 | 10/2021 | Jané López | |
| 2007/0270091 A1* | 11/2007 | Vleet | A22C 25/16 |
| | | | 452/102 |
| 2012/0190283 A1* | 7/2012 | Byrd | A22C 25/025 |
| | | | 452/105 |
| 2021/0153512 A1 | 5/2021 | Jané López | |
| 2022/0015379 A1* | 1/2022 | Alexandre | A22B 5/201 |

FOREIGN PATENT DOCUMENTS

| | | |
|---|---|---|
| DE | 101 05 588 A1 | 7/2001 |
| WO | 89/10698 A1 | 11/1989 |
| WO | 97/30594 A1 | 8/1997 |

* cited by examiner

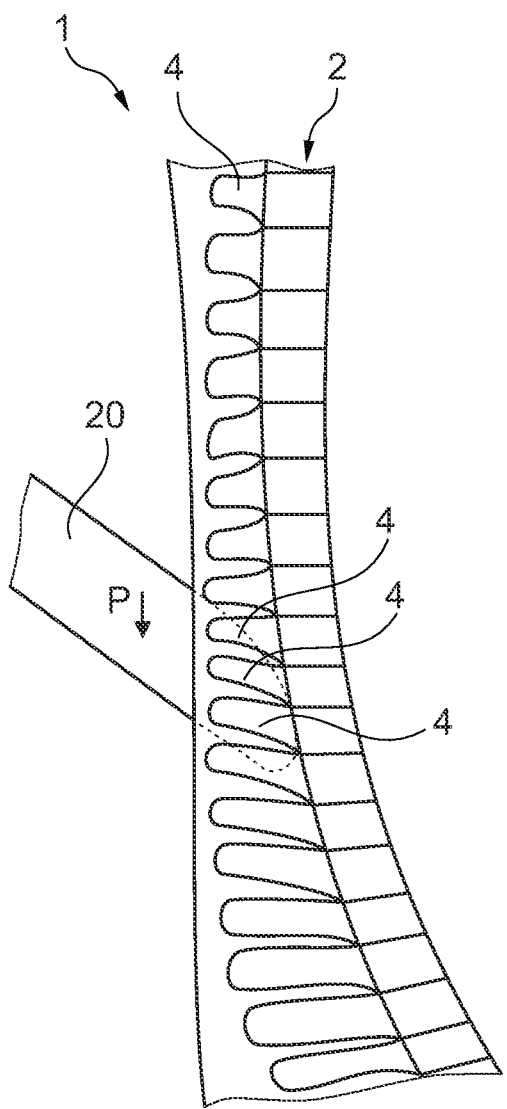
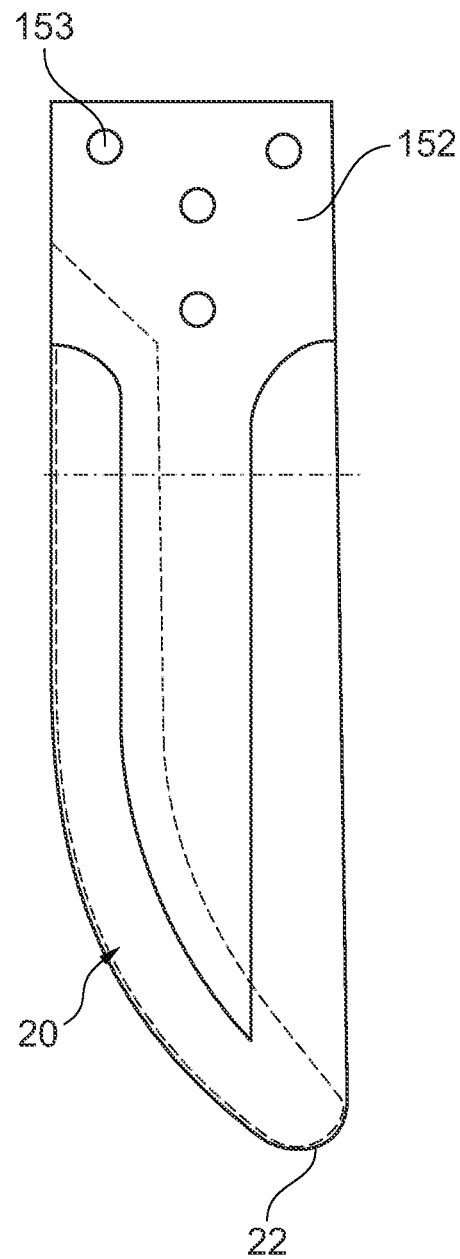
Fig. 1a
Fig. 1b

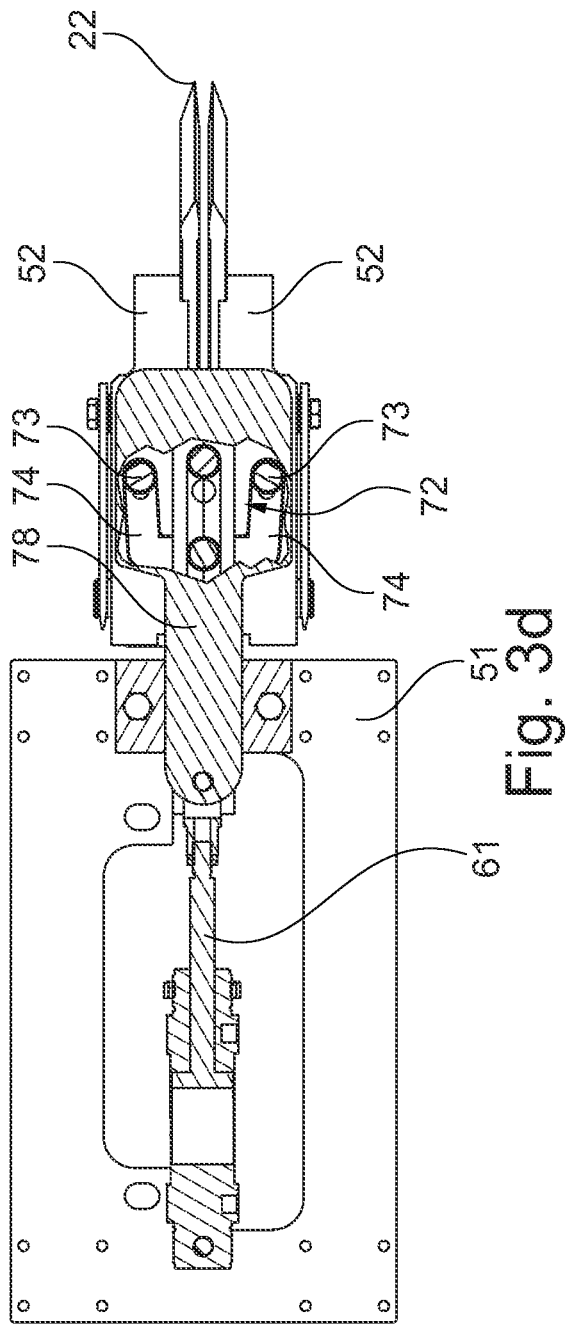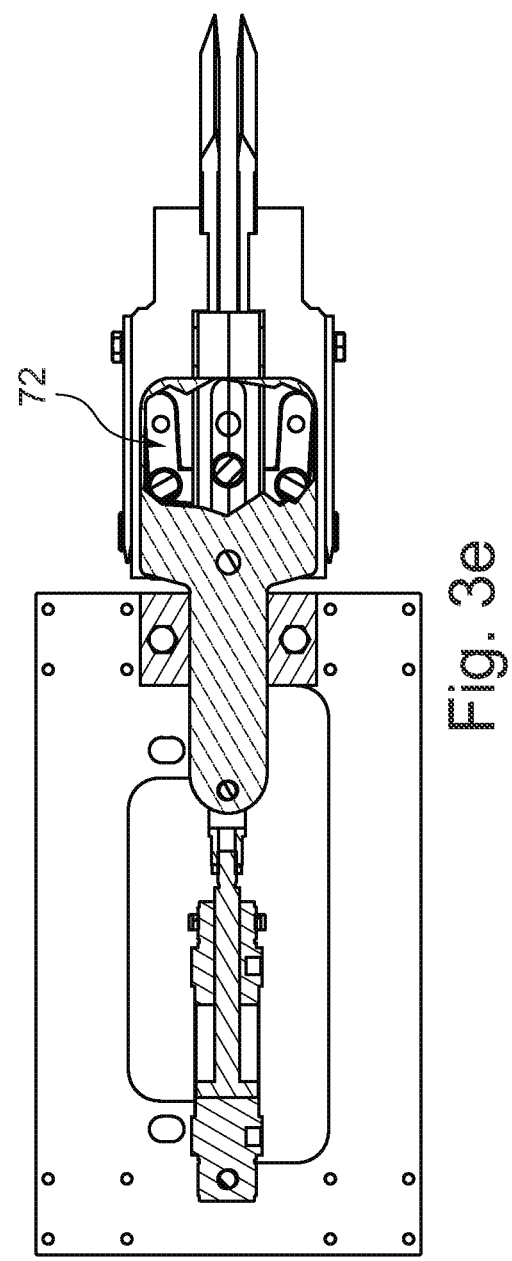

TOOL FOR CUTTING ALONG A PATH ALONG THE SPINOUS PROCESSES IN AN ANIMAL CARCASS, AND A SLAUGHTERHOUSE CUTTING DEVICE WITH THE TOOL

This application claims under 35 U.S.C. § 119(a) the benefit of the filing date of European Patent Convention Patent Application No. 20382654.0, filed on Jul. 17, 2020, the entire contents of which are incorporated herein by reference.

BACKGROUND OF THE INVENTION

Field of the Invention

The present invention concerns the cutting of animal carcasses using a processing tool moved along the spinous processes, commonly known as the feather bones.

Related Art

Known is a processing tool including a pair of opposite, parallel knives used for a carcass cutting operation, see WO 97/30594. In use thereof sometimes only some of the spinous processes along the animal spine will fit in the gap between the knives, whereby the knives will cut into the sides of the remaining spinous processes; this leads to bone fragments being cut off from the spine and appearing in the cut off meat. In other cases, cutting will be such that meat is left on the spinous processes.

SUMMARY OF THE INVENTION

It is an object of the present invention to improve the quality of the meat cut off from the spine and/or to allow for desired meat cuttings to be made.

According to the invention, this object is met by the processing tool including two opposite knives mounted to a knife holder via respective mounting structures, the knife holder further including an actuator, at least one of the mounting structures being movably mounted to the knife holder, the actuator being coupled to the movably mounted mounting structure to allow for the mounting structure to move relative to the knife holder.

The invention also relates to a slaughterhouse cutting device including the mentioned tool, a carrier structure, such as a robot, for controlled spatial movement of the tool connected with the carrier structure, a data provider configured for providing information about an animal carcass to be processed by the tool, such as based on a mechanical detection or an X-ray or ultra sound image of the animal carcass, or on animal carcass length or weight, or on an animal carcass fat probing, a computer device for establishing data representing the geometry of the spine of said animal to be processed and for establishing the path of movement along the spinous processes, and a controller controlling the actuator in accordance with the established data, to vary the width of the gap between the tip of said knives.

Preferably, the present invention finds use where the animal to be processed using the tool is a pig.

The actuator may be configured for varying the width of a gap between the tip of the knives from a minimum of between 4 mm and 8 mm up to a maximum of between 6 mm and 12 mm during the cutting.

Preferred embodiments are described and shown in the Specification and drawings

BRIEF DESCRIPTION OF THE DRAWINGS

FIG. 1a is a cross-sectional view of an animal carcass being cut,

FIG. 1b is a side view of an embodiment of a knife suitable for use in the present invention, FIGS. 3a-3f show a first embodiment of a knife holder according to the invention, for a processing tool, in perspective view, top views, cross-sectional views, and an exploded view, respectively.

DETAILED DESCRIPTION

Figure 2:
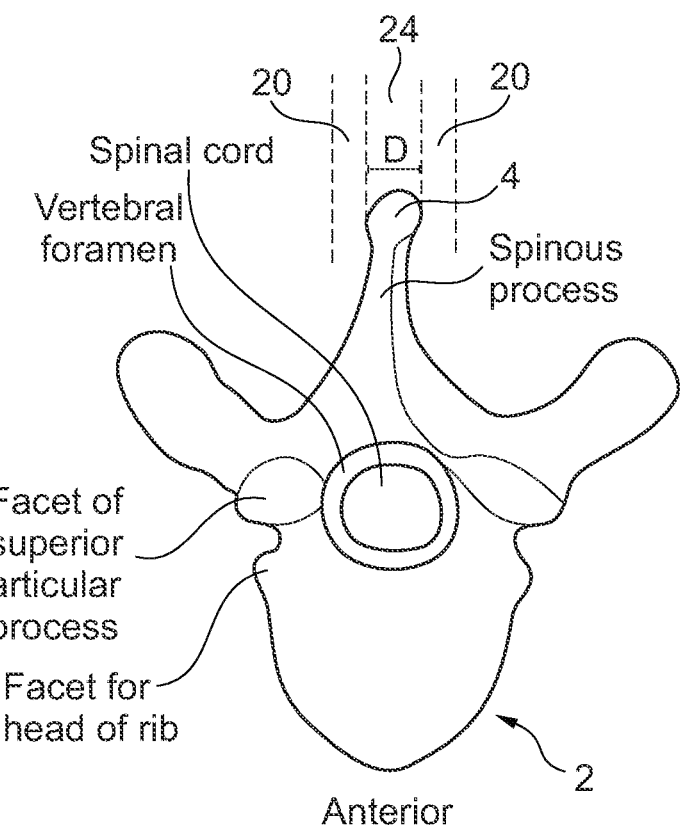
FIG. 2 is a cross-sectional, highly schematic view showing a spinal column with spinous recesses.

The invention will now be explained in more detail below by reference to preferred embodiments.

FIG. 1a shows one knife 20 of a pair of opposite, spaced apart knives that is being moved downwards, performing a cutting operation along the spine 2 of a slaughtered animal; the slaughtered animal carcass is schematically shown by numeral 1. One example of a known processing tool including such a pair of opposite knives used for a carcass cutting operation is disclosed in WO97/30594.

The pair of opposite knives 20 is mounted to a knife holder (not shown) to define a carcass processing tool. The knife holder on its side is secured to a carrier structure configured for moving the knife holder and, hence, the pair of knives 20 along a predetermined path P relative to the carcass 1, to perform the cutting operation. Normally, carcasses 1 as shown are processed in a slaughterhouse processing plant, suspended from an overhead conveyor along which are placed one or more such carrier structures, each for performing a carcass processing by a respective processing tool.

In operation of the prior art processing tool disclosed in WO97/30594, the pair of knives 20 is positioned by the carrier structure such that one knife 20 is on one side of the spine 2 while the opposite knife (not shown in FIG. 1a) is positioned on the opposite side of the spine 2, to cut meet free from the spinous processes 4 as the pair of knifes 20 is moved from the top of the carcass 1 along the path P. FIG. 1b is a side view of a knife 20 as disclosed in WO97/30594, the blade 20 having a tip 22 at one end and being integrally formed with a flat structure 152 at the other end, which structure 152 has through-going holes 153 receiving fastening bolts for mounting the knife 20 in a fixed position to the knife holder (not shown). A knife 20 as shown in FIGS. 1a and 1b may also find use with the present invention.

As shown in FIG. 2, with the prior art processing tool disclosed in WO97/30594 the width of a gap 24 between the two spaced-apart knifes 20 may be pre-selected such that all spinous processes 4 of all carcasses 1 processed by the processing tool may expectedly be accommodated within this gap 24. Alternatively, the width of the gap 24 may be pre-selected to correspond to an expected average dimension of all spinous processes 4 of all carcasses 1 to be processed. In the latter case only some of the spinous processes 4 along the spine 2 will fit in the gap 24 whereby the knives 20 will cut into the sides of the remaining spinous processes 4 in the course of the cutting operation; this leads to bone fragments being cut off from the spine 2 and appearing in the cut off meat, which must then be removed, requiring a work effort and leading to yield loss.

In FIG. 2 is shown a dimension D representing the width of one spinous process 4; when the size of the gap 24 is less than this width D the pair of knives 20 cuts off bone fragments from the spine 2, and where the size of the gap 24 is larger valuable meat will be left on the spinous processes and be discarded or sold at a much cheaper price. It is noted that, generally, the width D of the spinous processes 4 will for a given carcass 1 increase towards one end thereof, and that the width D for one animal at that end may be different from the width D at that end of another animal.

Figure 3A:
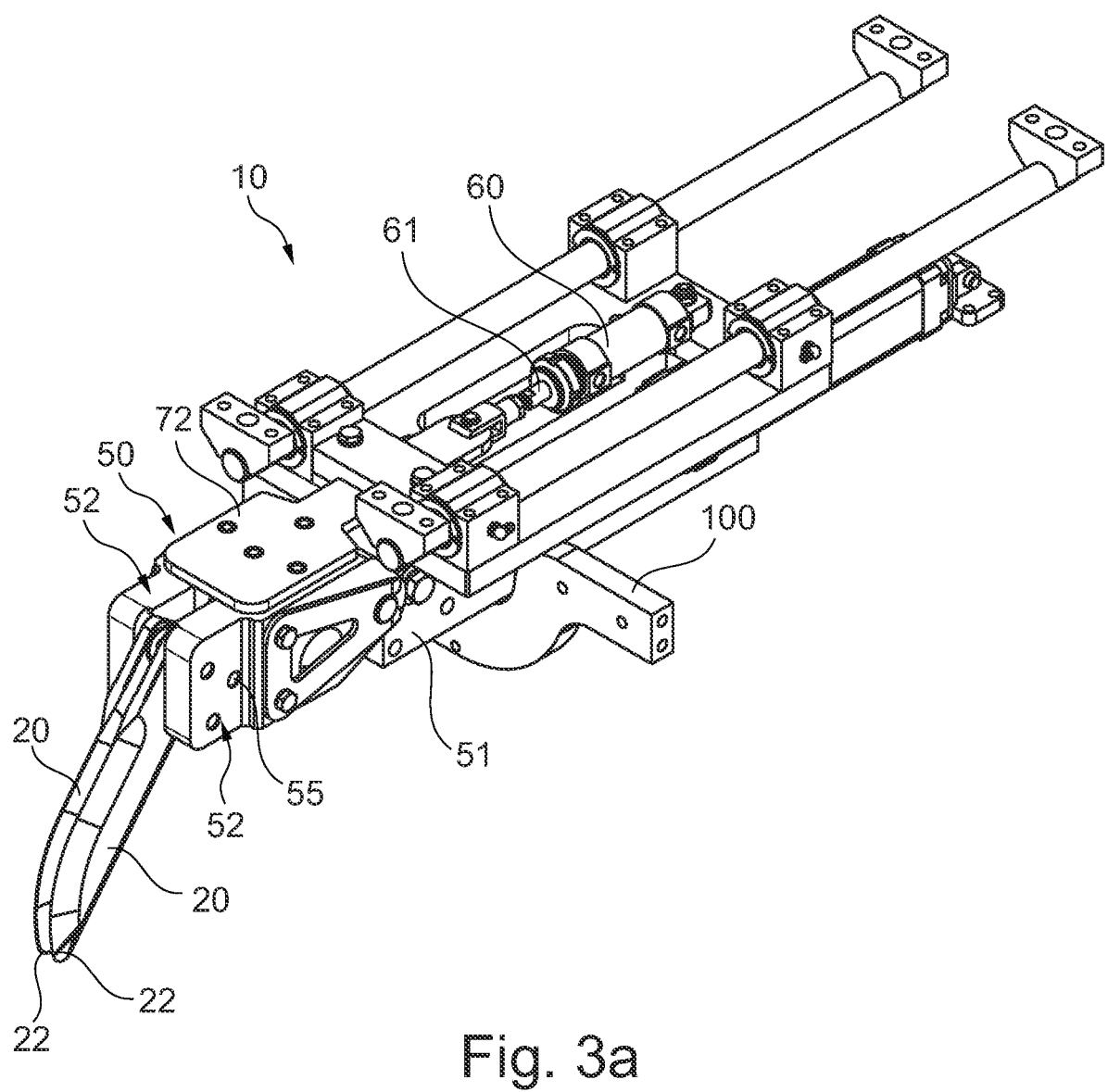

To avoid or reduce the number of bone fragments appearing, and/or to obtain a desired meat quality, an embodiment of a processing tool 10 of the present invention, including a novel knife holder 50, is shown in FIG. 3a in a perspective view. A carrier structure (not shown) for this processing tool 10 may be defined by a robot including a tool holder at the end of an articulated robot arm, which robot may, by way of example, be of the type disclosed in CA 3,073,638. The knife holder 50 may be provided with a connector flange 100 with mounting holes for securing the knife holder 50 to the tool holder. Movement of the knife holder 50 by the carrier structure defines the aforementioned path P and may also involve a component of movement out of the drawing plane represented by FIG. 1a.

Figure 3B:
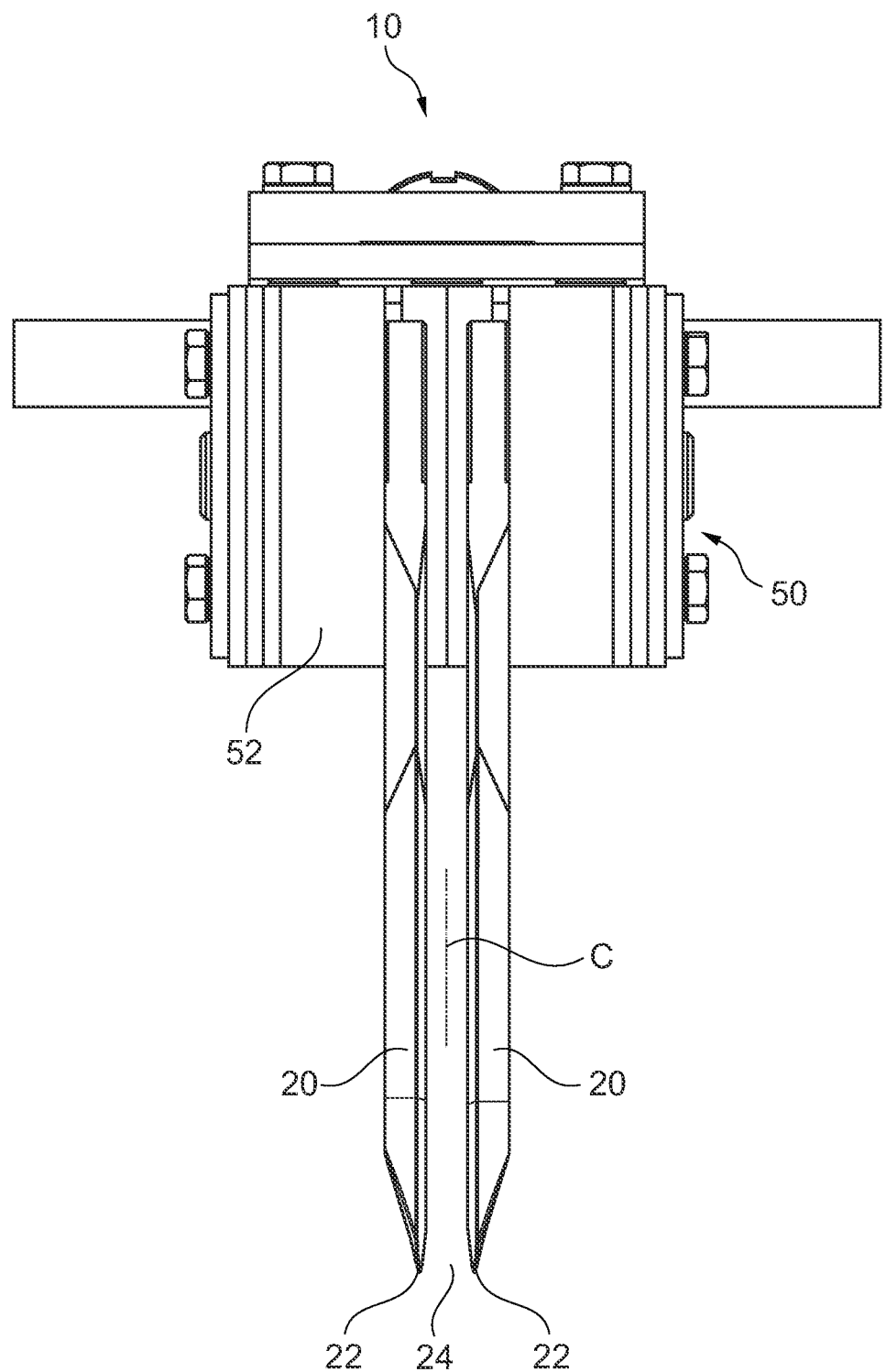
Figure 3C:
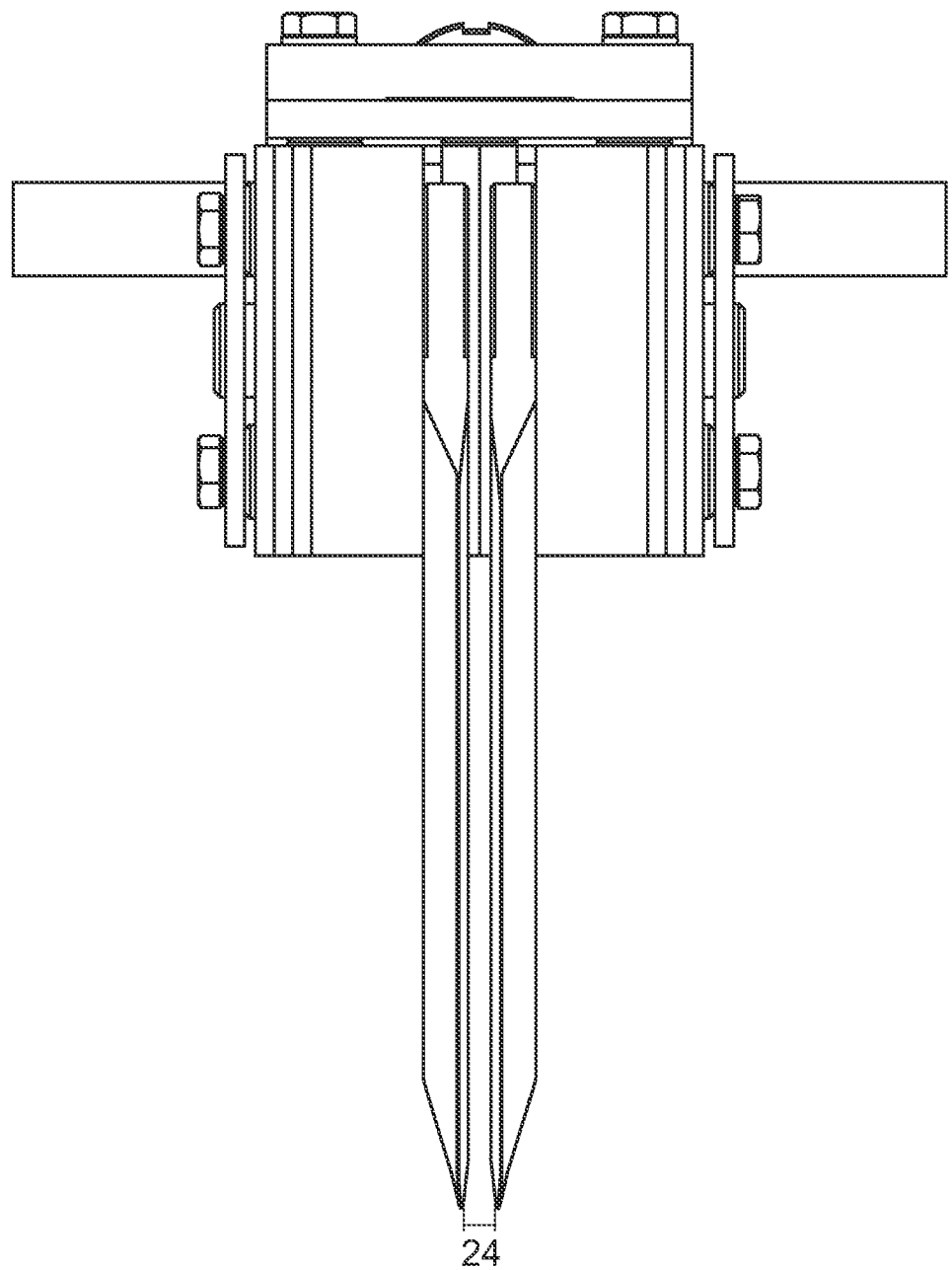

Generally, the novel knife holder 50 comprises two opposite mounting structures 52, that may be integral with the knives 20, or preferably releasably connected with the knives 20, such as by bolts and nuts, being movably coupled with a frame 51 of the knife holder 50. The coupling with the frame 51 of the knife holder 50 is constructed such that the two mounting structures 52 may move relative to each other, normally with a translational movement to and from each other, driven by an actuator 60. In this manner the gap 24 between the knives 20 at their tip 22 may be varied as shown in FIGS. 3b and 3c, preferably controlled by a computer, to accommodate for the variations in the spinous process width D as the pair of knives 20 move from the top towards the end of the carcass 1, and for a different spinous process width D variation from one animal to the next. In another embodiment (not shown) only one of the mounting structures 52 and, hence, only one of the two knives 20 may be movably coupled to the knife holder 50 frame 51, or the knives could be offset sideways to leave more meat on one side only.

The knife holder 50 shown in FIG. 3a is shown in a cross-sectional view in FIGS. 3d and 3e; in this embodiment a pneumatic actuator 60 mounted to the frame 51 is used wherein movement of an actuator piston rod 61 is converted into a translational movement of each of the two mounting structures 52 so as to vary the width of the gap 24 at the knife 20 tips 22. The knife holder 50 is operated such that movement of the knives 20, that preferably remain parallel, relative to a centre line C (see FIG. 3b) of the knife holder 50 is synchronised and symmetrical. In FIG. 3c the width of the gap 24 between the knives 20 has been reduced by the actuator 60.

Figure 3F:
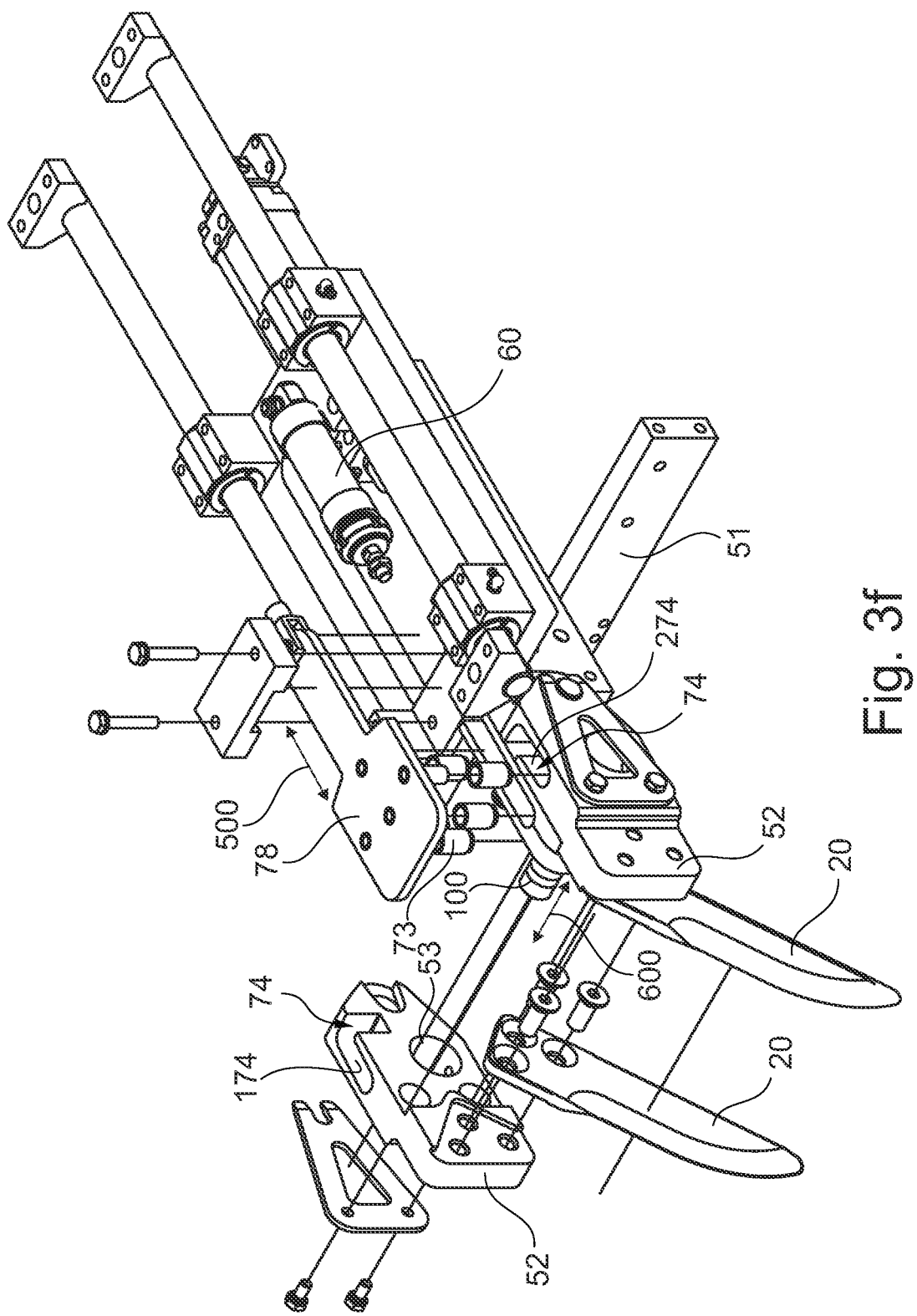
Figure 3G:
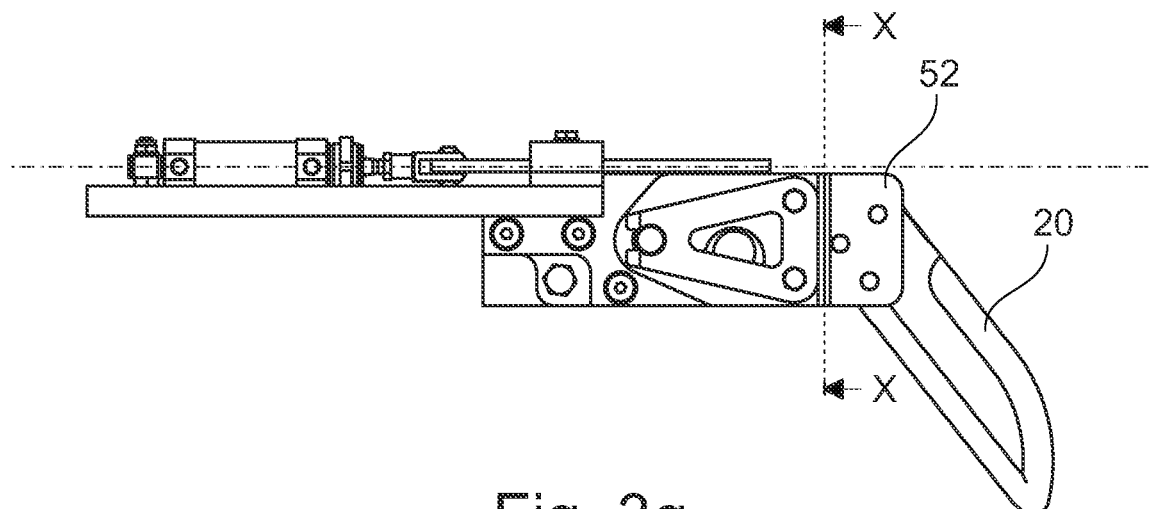
FIG. 3g shows highly schematically a second embodiment of a knife holder according to the invention, for a processing tool, seen in a side view.

FIGS. 3d-3f show in details a coupling 72 for coupling the two opposite mounting structures 52 with the frame 51 of the knife holder 50. The two knives 20 are each releasably connected to a corresponding mounting structure 52, and— as seen best in FIG. 3f—a number of pairs of opposite openings 53 in each mounting structure 52 slidably receives a respective cross-pin 100 that allows the two mounting structures 52 to move to and from each other as shown by arrow 600 and which is each secured to the frame 51. The coupling 72 includes an elongated track 74 formed in each mounting structure 52 and as well as pins 73 mounted to a plate 78 that is displaceably secured to the frame 51 of the knife holder 50.

Each pin 73 is fitted into a corresponding one of the two tracks 74 and the plate 78 is connected to the actuator 60 such that activation of the actuator 60 brings about a displacement of the plate 78 in the direction shown by arrow 500 and, hence, a movement of each pin 73 along the length of the corresponding track 74. As seen, the two tracks 74 diverge away from each other in the direction towards the tips 22 of the knives 20. The tracks 74 have each an inner wall 274 and an opposite parallel outer wall 174; when the pins 73 are moved forward, towards the tips 22 of the knives 20, by the actuator 60 driving the plate 78 forwards, the pins 73 slide against the respective inner wall 274 and apply a sideways force on each mounting structure 52, forcing them together into the position shown in FIG. 3d wherein the width 24 is at a selected minimum.

The mounting structures 52 may in use be brought into an initial configuration by the actuator 60, with a predetermined gap 24 at the tip 22 of the knives 20, as shown in FIG. 3d. As the tool 10 is moved along the path P relative to the carcass 1 a transverse pressure, seeking to spread the mounting structures 52 with the knives 20 apart, is applied to the knives 20 by the spinous processes 4 due to the increasing width D of the spinous processes 4 along which the knives 20 ride and cut. The knives 20 may be biased towards each other and the spreading movement of the knives 20 away from each other be allowed against the force of a spring or, in the shown embodiment, against the actuator 60 cylinder pressure seeking to resist movement of the pins 73 along the tracks 74 towards the rear position shown in FIG. 3e; after completion of the movement along the path P the mounting structures 52 and, hence, the knives 20, are returned to their initial configuration shown in FIG. 3d or 3e, or into another configuration, by the aforementioned spring or actuator 60 cylinder pressure, or actively driven by the actuator 60, as required for processing a subsequent carcass 1. The aforementioned springs may be located between the knives 20 and their corresponding mounting structure 52.

It is noted that in combination with, or in lieu of, the aforementioned transverse translational movement of the knives 20, a rotation of the two mountings structures 52 and, hence, the two knives 20, about a respective turning axis (drawn as a vertical axis marked X in the example in FIG. 3f, which only schematically represents such an alternative embodiment) may also be foreseen to adjust the width of the gap 24 at the tip 22 of the knives 20.

Figure 4A:
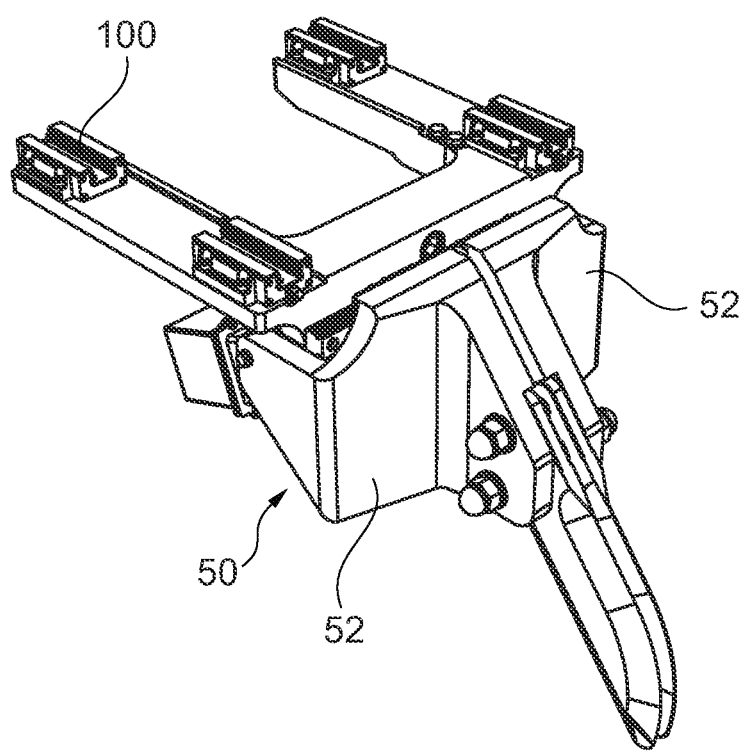
FIGS. 4a-4c show a third embodiment of a knife holder according to the invention, for a processing tool, seen in perspective view, side view and top view, respectively.
Figure 4B:
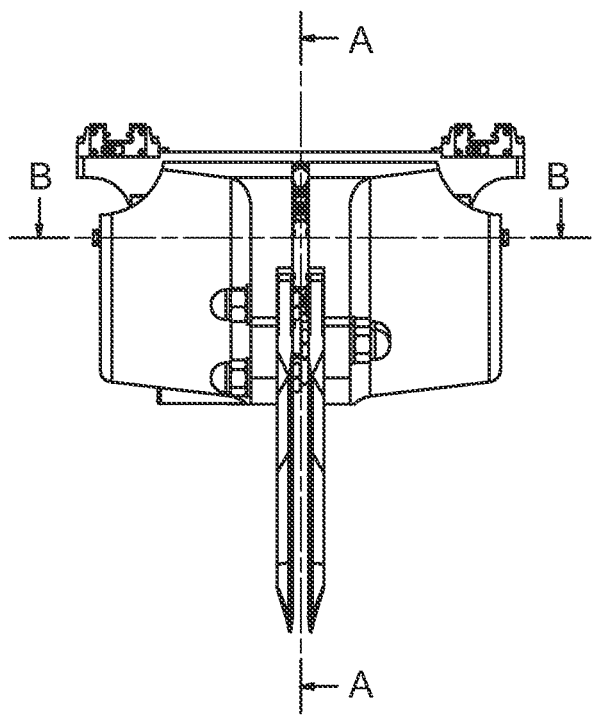
Figure 4C:
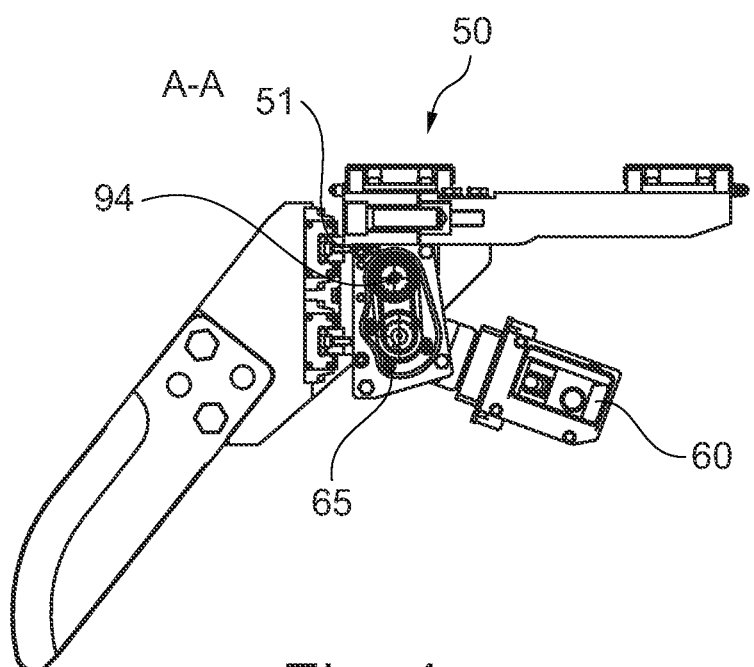

FIGS. 4a-4c show an alternative embodiment of the knife holder 50 involving the use of a servomotor 60 and wherein the aforementioned transverse translational movement of the two mounting structures 52 to and from each other follows from a rotation of two ball screws, each connected at one end to a bearing of a respective one of the mounting structures 52 as well as for rotation to the servomotor 60 via a suitable drive, shown here as a belt drive 65. In the end view of FIG. 4c the end of a first one of the two ball screws, referenced by numeral 94, is shown where it is received in the bearing of the corresponding mounting structure 52. The second ball screw is arranged in extension of the shown first ball screw 94 and connected to its corresponding mounting structure 52.

In an embodiment of a carcass 1 processing plant including the processing tool 10 of the present invention the adjustment of the width of the gap 24 at the tip 22 and the correct positioning and movement of the pair of knives 20 by the carrier structure may take into account different sizes of animal carcasses and generally follow a preceding computer analysis of the carcass 1, using a vision system (cameras), X-ray or ultra sound imaging, or other representation based on eg. carcass 1 length or weight, or carcass fat probing, i) to determine the proper point of entry of the tips 22 of the knives 20 into the carcass 1 on either side of the spine 2, ii) to determine the spinous process 4 width D, and variations thereof along the length of the spine 2, and/or iii) to determine the cutting movement to be carried out, i.e. a path P of movement that is aligned with the shape and curvature of the spine 2, after which a controller controls the actuator 60 as the tool 10 moves along the path P.

The adjustment of the width of the gap 24 at the tip 22 may alternatively or additionally be in accordance with a computer-stored carcass dependent recipe which may be for example a) so as to leave more meat on the most valuable piece (i.e.: loins) or b) so as to transfer meat from loins to the back bones or to the neck bones, wherein the recipe may be generated by an operator for the carcass 1 to be processed. By way of example, it may be desirable to cut the loins very tight to the featherbones for optimal loin yield but depending of market pricing or demand to leave more meat on the neckbones by adjusting the knives with a narrow gap 24 for eg. about ¾ of the carcass 1 length and wide for the remaining length.

In embodiments, the tool 10 may operate on the basis of two or more fixed distances and/or passive pneumatic resistance to dynamically adjust the following of the bones.

The invention claimed is:

1. A processing tool for cutting along a path (P) along spinous processes in an animal carcass, comprising:
   two opposite knives mounted to a knife holder via respective mounting structures, said knife holder further comprising an actuator, at least one of said respective mounting structures being movably mounted to said knife holder, said actuator being coupled to said at least one of said respective mounting structures being movably mounted to said knife holder for moving said at least one of said respective mounting structures relative to said knife holder; and
   said actuator being configured for translationally moving said at least one of said respective mounting structures to vary a width of a gap between said two opposite knives.

2. The processing tool according to claim 1, said actuator being configured for varying said width of said gap from a minimum of between 4 mm and 8 mm during cutting along said path (P).

3. The processing tool according to claim 1, said actuator being configured for varying said width of said gap up to a maximum of between 6 mm and 12 mm during movement along said path (P).

4. The processing tool according to claim 1, comprising a controller for controlling said movement of said at least one of said respective mounting structures by said actuator.

5. The processing tool according to claim 1, said knife holder comprising:
   a frame carrying said actuator; and
   a coupling connecting said at least one of said respective mounting structures with said actuator to allow for said translationally moving said at least one of said respective mounting structures relative to said knife holder.

6. The processing tool according to claim 5, said coupling comprising:
   an elongated track formed in each of said respective mounting structures; and
   pins connected to said actuator and mounted for movement relative to said frame, a respective one of said pins fitted into a corresponding elongated track formed in each of said respective mounting structures, each said elongated track formed in each of said respective mounting structures diverging away from each other and defined each by a first wall and an opposite second wall, wherein when said pins are moved along said corresponding elongated track said pins apply a sideways force on each of said respective mounting structures.

7. The processing tool according to claim 6, said actuator comprising a pneumatically or hydraulically driven piston.

8. The processing tool according to claim 5, said actuator comprising a servomotor, said coupling comprising a pair of ball screws, each of said pair of ball screws being connected to a corresponding one of said respective mounting structures and to said servomotor, wherein rotation of each of said pair of ball screws bring about said translational movement of said respective mounting structures relative to said knife holder.

9. A processing tool for cutting along a path (P) along spinous processes in an animal carcass, comprising:
   two opposite knives mounted to a knife holder via respective mounting structures, said knife holder further comprising an actuator, at least one of said respective mounting structures being movably mounted to said knife holder, said actuator being coupled to said at least one of said respective mounting structures being movably mounted to said knife holder for moving said at least one of said respective mounting structures relative to said knife holder; and
   said actuator being configured for rotating said at least one of said respective mounting structures about a respective axis (X), to vary a width of a gap between said two opposite knives at a tip of said two opposite knives.

10. A method of using a processing tool for cutting along a path (P) along spinous processes in an animal carcass, wherein said processing tool comprises:
    two opposite knives mounted to a knife holder via respective mounting structures, said knife holder further comprising an actuator, at least one of said respective mounting structures being movably mounted to said knife holder, said actuator being coupled to said at least one of said respective mounting structures being movably mounted to said knife holder for moving said at least one of said respective mounting structures relative to said knife holder;
    the method comprising:
    moving said processing tool along a path (P);
    operating said actuator to vary, during said moving said processing tool along said path (P), a width between said two opposite knives at a tip of said two opposite knives.

11. A method of using a processing tool for cutting along a path (P) along spinous processes in an animal carcass, wherein said processing tool comprises:
    two opposite knives mounted to a knife holder via respective mounting structures, said knife holder further comprising an actuator, at least one of said respective mounting structures being movably mounted to said knife holder, said actuator being coupled to said at least one of said respective mounting structures being movably mounted to said knife holder for moving said at least one of said respective mounting structures relative to said knife holder;

the method comprising:
biasing said two opposite knives towards each other;
allowing movement of said two opposite knives away from each other during cutting along a path (P) along spinous processes in an animal carcass; and
operating said actuator on completion of said cutting to return said two opposite knives to a position required for processing a subsequent animal carcass.

12. A processing tool for cutting along a path (P) along spinous processes in a suspended pig carcass, wherein said processing tool comprises:
two opposite knives each comprising a tip, mounted to a knife holder via respective mounting structures, said knife holder further comprising an actuator, at least one of said respective mounting structures being movably mounted to said knife holder, said actuator being coupled to said at least one of said respective mounting structures for translationally moving said respective mounting structures relative to said knife holder, to vary a width of a gap between said two opposite knives at said tip; and
a controller for controlling movement of said respective mounting structures by said actuator.

13. The processing tool of claim 12, said respective mounting structures being an integral part of said two opposite knives or being releasably connected to said two opposite knives.

14. The processing tool according to claim 12, each of said respective mounting structures being movably mounted to said knife holder, said actuator being coupled to each of said respective mounting structures for synchronized movement of said two opposite knives.

15. The processing tool according to claim 12, said actuator being configured for varying said width of said gap from a minimum of between 4 mm and 8 mm during cutting along a path (P).

16. The processing tool according to claim 15, said actuator being configured for varying said width of said gap up to a maximum of between 6 mm and 12 mm during movement along said path (P).

17. The processing tool according to claim 12, said knife holder comprising:
a frame carrying said actuator; and
a coupling connecting said at least one of said mounting structures with said actuator to allow for said translationally moving said respective mounting structures relative to said knife holder.

18. The processing tool according to claim 17, said coupling comprising:
an elongated track formed in each of said respective mounting structures; and
pins connected to said actuator and mounted for movement relative to said frame, a respective one of said pins fitted into a corresponding elongated track formed in each of said respective mounting structures, each said elongated track formed in each of said respective mounting structures diverging away from each other and defined each by a first wall and an opposite second wall, wherein when said pins are moved along said corresponding elongated track said pins apply a sideways force on each of said respective mounting structures.

19. The processing tool according to claim 18, said actuator comprising a pneumatically or hydraulically driven piston.

20. The processing tool according to claim 17, said actuator comprising a servomotor, said coupling comprising a pair of ball screws, each of said pair of ball screws being connected to a corresponding one of said respective mounting structures, and to said servomotor, wherein rotation of said pair of ball screws bring about said translational movement of said respective mounting structures relative to said knife holder.

21. A method of using a processing tool for cutting along a path (P) along spinous processes in a suspended pig carcass, wherein said processing tool comprises:
two opposite parallel knives each comprising a tip, mounted to a knife holder via respective mounting structures, said knife holder further comprising an actuator, at least one of said respective mounting structures being movably mounted to said knife holder, said actuator being coupled to said at least one of said respective mounting structures for translationally moving said respective mounting structures relative to said knife holder, to vary a width of a gap between said two opposite parallel knives at said tip; and
a controller for controlling movement of said respective mounting structures by said actuator;
wherein the method comprises:
moving said processing tool along a path (P);
operating said actuator to vary, during said moving said processing tool along said path (P), said width of said gap between said two opposite parallel knives at said tip of said two opposite parallel knives.

22. A method of using a processing tool for cutting along a path (P) along spinous processes in a suspended pig carcass, wherein said processing tool comprises:
two opposite parallel knives each comprising a tip, mounted to a knife holder via respective mounting structures, said knife holder further comprising an actuator, at least one of said respective mounting structures being movably mounted to said knife holder, said actuator being coupled to said at least one of said respective mounting structures for translationally moving said respective mounting structures relative to said knife holder, to vary a width of a gap between said two opposite parallel knives at said tip; and
a controller for controlling movement of said respective mounting structures by said actuator;
wherein the method comprises:
biasing said two opposite parallel knives towards each other; and
allowing movement of said two opposite parallel knives away from each other during cutting along a path (P) along spinous processes in a suspended pig carcass and operating said actuator on completion of said cutting to return said two opposite parallel knives to a position required for processing a subsequent animal carcass.

23. A slaughterhouse cutting device comprising:
a processing tool for cutting along a path (P) along spinous processes in a suspended animal carcass, said processing tool comprises:
two opposite knives mounted to a knife holder via respective mounting structures; and
an actuator; wherein at least one of said respective mounting structures being movably mounted to said knife holder, said actuator being coupled to said respective mounting structures being movable mounted to said knife holder for moving said respective mounting structures relative to said knife holder to vary a width of a gap between said two opposite knives at a tip of said two opposite knives;

a carrier structure, for controlled spatial movement of said processing tool connected with said carrier structure;

a data provider configured for providing information about an animal carcass to be processed by said processing tool, based on i) a vision system (camera), an X-ray or ultra sound image of said animal carcass, or on length or weight of said animal carcass, or ii) fat of said animal carcass, or iii) a digital recipe stored in a memory;

a computer device for establishing data representing geometry of a spine of said animal carcass to be processed and for establishing said path (P) along said spinous processes; and a controller controlling said actuator in accordance with said established data, to vary said width of said gap as the processing tool is moved along said path (P).

* * * * *